(12) United States Patent
Tsukamoto

(10) Patent No.: US 10,404,954 B2
(45) Date of Patent: Sep. 3, 2019

(54) OPTICAL DEFLECTION APPARATUS, IMAGE PROJECTOR, OPTICAL WRITING UNIT, AND OBJECT RECOGNITION DEVICE

(71) Applicant: RICOH COMPANY, LTD., Tokyo (JP)

(72) Inventor: Kazuhiko Tsukamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 399 days.

(21) Appl. No.: 15/406,950

(22) Filed: Jan. 16, 2017

(65) Prior Publication Data

US 2017/0214891 A1 Jul. 27, 2017

(30) Foreign Application Priority Data

Jan. 21, 2016 (JP) ................ 2016-009491
Dec. 8, 2016 (JP) ................ 2016-238252

(51) Int. Cl.
G02B 26/10 (2006.01)
G02B 27/01 (2006.01)
G03G 15/04 (2006.01)
H04N 9/31 (2006.01)
G02B 26/08 (2006.01)
(Continued)

(52) U.S. Cl.
CPC ......... *H04N 9/3135* (2013.01); *G01S 7/4817* (2013.01); *G01S 7/497* (2013.01); *G02B 26/0858* (2013.01); *G02B 26/101* (2013.01); *G02B 26/105* (2013.01); *G02B 27/01* (2013.01); *G02B 27/0101* (2013.01); *G03G 15/04036* (2013.01); *G03G 15/04072* (2013.01);
(Continued)

(58) Field of Classification Search
CPC ............ G02B 26/105; G02B 26/101; G02B 27/0101; G02B 27/01; G02B 26/0858; H04N 9/3194; G03G 15/04036; G03G 15/04072; G03G 15/80; G01S 7/4814; G01S 17/936; G01S 7/4817; G01S 7/497
USPC ........................................ 356/4.01
See application file for complete search history.

(56) References Cited

U.S. PATENT DOCUMENTS 7,141,915 B2 * 11/2006 Takeuchi .......... B81B 3/0018
310/328

FOREIGN PATENT DOCUMENTS

JP 2005-031266 2/2005
JP 2015-132762 7/2015
JP 2016-224377 12/2016

* cited by examiner

Primary Examiner — Daniel L Murphy
(74) Attorney, Agent, or Firm — Oblon, McClelland, Maier & Neustadt, L.L.P.

(57) ABSTRACT

An optical deflection apparatus, an image projector, an optical writing unit, and an object recognition device. The optical deflection apparatus includes a mirror unit having a reflection plane, a plurality of actuators to move the mirror unit around a prescribed axis, a drive controller to control operation of the plurality of actuators, and an abnormality detector to detect an abnormality in at least one of the plurality of actuators. When the abnormality detector detects an abnormality in at least one of the plurality of actuators, the drive controller controls another one of the plurality of actuators to deflect a light flux incident on the mirror unit. The image projector includes the optical deflection apparatus, and a light source unit to emit a laser beam. The optical deflection apparatus projects an image formed by optically scanning the laser beam emitted from the light source unit.

13 Claims, 13 Drawing Sheets

(51) Int. Cl.
  *G03G 15/00* (2006.01)
  *G01S 7/481* (2006.01)
  *G01S 7/497* (2006.01)
  *G01S 17/93* (2006.01)
(52) U.S. Cl.
  CPC ........... *G03G 15/80* (2013.01); *H04N 9/3194* (2013.01); *G01S 7/4814* (2013.01); *G01S 17/936* (2013.01)

NORMAL

WHEN IN FAILURE

OPTICAL DEFLECTION APPARATUS, IMAGE PROJECTOR, OPTICAL WRITING UNIT, AND OBJECT RECOGNITION DEVICE

CROSS-REFERENCE TO RELATED APPLICATIONS

This patent application is based on and claims priority pursuant to 35 U.S.C. § 119(a) to Japanese Patent Application Nos. 2016-009491 and 2016-238252, filed on Jan. 21, 2016, and Dec. 8, 2016, respectively, in the Japan Patent Office, the entire disclosures of which are hereby incorporated by reference herein.

BACKGROUND

Technical Field

Embodiments of the present disclosure relate to an optical deflection apparatus, an image projector, an optical writing unit, and an object recognition device.

Background Art

Optical deflection apparatuses that two-dimensionally scan a laser beam emitted from a light source are known in the art.

Such an optical deflection apparatus includes a sub-scanning oscillation unit that oscillates around a sub-scanning oscillation axis, and a mirror unit that oscillates around a circumferential oscillation axis. The sub-scanning oscillation unit is supported by a supporting unit through an arm so as to be rotatable in the sub-scanning direction, and the mirror unit is supported by the sub-scanning oscillation unit through a plurality of beams in a main-scanning oscillation axis so as to be rotatable around the main-scanning oscillation axis. A piezoelectric circuit including a piezoelectric element is mounted on the surface of each beam. Due to the extension and contraction of the piezoelectric element, the beams elastically deform to rotate the mirror unit around the main-scanning oscillation axis and make the sub-scanning oscillation unit oscillate around the sub-scanning axis. Accordingly, the laser beam incident on the mirror unit performs two-dimensional scanning (deflection).

SUMMARY

Embodiments of the present disclosure described herein provide an optical deflection apparatus, an image projector, an optical writing unit, and an object recognition device. The optical deflection apparatus includes a mirror unit having a reflection plane, a plurality of actuators to move the mirror unit around a prescribed axis, a drive controller to control operation of the plurality of actuators, and an abnormality detector to detect an abnormality in at least one of the plurality of actuators. When the abnormality detector detects an abnormality in at least one of the plurality of actuators, the drive controller controls another one of the plurality of actuators to deflect a light flux incident on the mirror unit. The image projector includes the optical deflection apparatus, and a light source unit to emit a laser beam. The optical deflection apparatus projects an image formed by optically scanning the laser beam emitted from the light source unit. The optical writing unit includes the optical deflection apparatus, and an imaging optical system to form an image of reflection light, scanned by the optical deflection apparatus, in a state of spot on a to-be-scanned surface.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
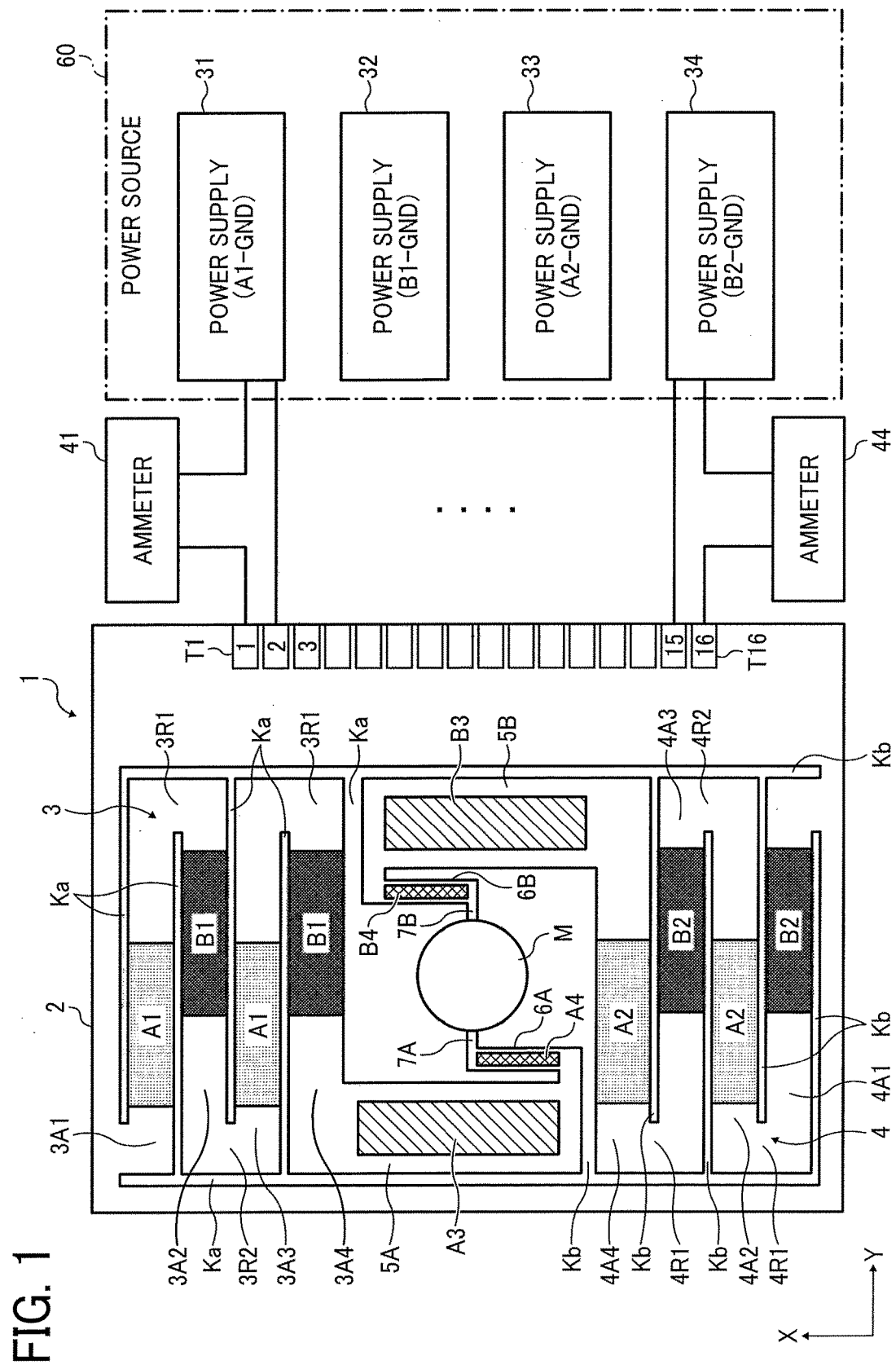
FIG. 1 is a plan view of a light deflector used in an optical deflection apparatus according to a first embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Hereinafter, embodiments of an optical deflection apparatus, an image projector, an optical writing unit, and an object recognition device are described with reference to the drawings.

FIRST EMBODIMENT

FIG. 1 illustrates a light deflector 1 used in an optical deflection apparatus 120 (see FIG. 2), according to a first embodiment of the present disclosure.

The light deflector 1 is a so-called MEMS device. The light deflector 1 includes a substrate 2 of a frame shape, a pair of elastic members (second elastic members) 3 and 4 that are formed by a plurality of slits Ka and Kb in a serpentine shape, and a pair of bases 5A and 5B that are supported by the elastic members 3 and 4. Moreover, the light deflector 1 includes a pair of mirror supporting members (first elastic member) 6A and 6B that are supported by the pair of bases 5A and 5B, and a pair of torsion bars 7A and 7B attached to a pair of mirror supporting members 6A and 6B to support a mirror unit M. Note also that the substrate 2, the elastic members 3 and 4, the bases 5A and 5B, the mirror supporting members 6A and 6B, and the torsion bars 7A and 7B are made from a sheet of silicon on insulator (SOI) wafer. For example, the mirror unit M is formed by evaporating a thin metal film made of Ag, Al, or the like onto a mirror base to form a reflection face, and such a mirror base is made from the SOI wafer and integrated into the torsion bars 7A and 7B.

On the surface of the substrate 2 at one end (i.e., on the right end side in FIG. 1), a plurality of terminals T1 to T16 are disposed to drive a plurality of piezoelectric drive circuits, as will be described later.

The piezoelectric drive circuits have a laminated structure including, for example, an upper electrode, a piezoelectric element, and a lower electrode. When a driving voltage is applied to the piezoelectric element by the upper electrode and the lower electrode, the piezoelectric element deforms (expands and contracts) such that the elastic members deform to drive the mirror unit M.

Elastic Member 3

The elastic member 3 includes a plurality of beams 3A1 to 3A4 disposed in parallel. One end (left end in FIG. 1) of the beam 3A1 is attached to the substrate 2, and a left end of the beam 3A4 is attached to an upper part of the base 5A. Moreover, right ends of the beams 3A1 and 3A3 are coupled to each other by a coupler 3R1, and right ends of the beams 3A2 and 3A4 are coupled to each other by another coupler 3R1. In a similar manner, left ends of the beams 3A2 and 3A3 are coupled to each other by a coupler 3R2.

On each surface of the beams 3A1 and 3A3, a piezoelectric drive circuit (second driving circuit: sub driving circuit) A1 is mounted, and on each surface of the beams 3A2 and 3A4, a piezoelectric drive circuit (second driving circuit: sub driving circuit) B1 is mounted.

Elastic Member 4

The elastic member 4 includes a plurality of beams 4A1 to 4A4 disposed in parallel. A right end of the beam 4A1 is attached to the substrate 2, and a right end of the beam 4A4 is attached to a bottom of the base 5B (see FIG. 1). Moreover, left ends of the beams 4A1 and 4A3 are coupled to each other by a coupler 4R1, and left ends of the beams 4A2 and 4A4 are coupled to each other by another coupler 4R1. In a similar manner, right ends of the beams 4A2 and 4A3 are coupled to each other by a coupler 4R2.

On each surface of the beams 4A1 and 4A3, a piezoelectric drive circuit (second driving circuit: sub driving circuit) B2 that elastically deforms the beams 4A1 and 4A3 is mounted, and on each surface of the beams 4A2 and 4A4, a piezoelectric drive circuit (second driving circuit: sub driving circuit) A2 that elastically deforms the beams 4A2 and 4A4 is mounted.

Different driving voltages are applied to the piezoelectric drive circuits A1 and A2 and the piezoelectric drive circuits B1 and B2, respectively. Accordingly, the beams 3A1 to 3A4 and the beams 4A1 to 4A4 curve, and the beams 3A1 to 3A4 and the beams 4A1 to 4A4, which are in close proximity to each other, bend in varying directions. Such bending is cumulative, and the mirror unit M is rotated to a large degree around the X-axis (i.e., around the second axis).

Due to the rotation of the minor unit M around the X-axis, the mirror unit M can perform scanning (deflection) in the direction perpendicular to the reflection light (namely, in the Y-axis direction: sub-scanning direction). In other words, the mirror unit M rotates around the X-axis (second axis) that is perpendicular to the Y-axis (first axis).

Although two sets of four beams (i.e., the beams 3A1 to 3A4 and the beams 4A1 to 4A4) are disposed in the present embodiment, in actuality, a larger number of beams are disposed. For the sake of explanatory convenience, sets of only four beams are illustrated. The piezoelectric drive circuits are satisfactory as long as they are independently provided for the beams, and the size or shape, and the arrangement of the piezoelectric drive circuits are not limited to the embodiment as described above.

Bases 5A, 5B

On the surfaces of the bases 5A and 5B, forced piezoelectric drive circuits (forced driving circuits) A3 and B3 that elastically deform the bases 5A and 5B in a forced manner are mounted, respectively.

The bases 5A and 5B support the mirror supporting members 6A and 6B, and piezoelectric drive circuits (first driving circuits: main driving circuits) A4 and B4 that elastically deform the mirror supporting members 6A and 6B are mounted on the mirror supporting member 6A and 6B, respectively.

The mirror supporting member 6A and 6B support the mirror unit M via the torsion bars 7A and 7B such that the mirror unit M can rotate around the Y-axis (first axis). As the mirror supporting members 6A and 6B elastically deform, the torsion bars 7A and 7B and the mirror supporting members 6A and 6B resonate and the mirror unit M oscillates around the Y-axis (first axis). Due to this oscillation, the reflected laser beam (light flux) incident on the mirror unit M scans (deflects) a prescribed range in the X direction (main scanning direction).

When the forced piezoelectric drive circuits A3 and B3 operate, the bases 5A and 5B elastically deform to deflect the laser beam incident on the mirror unit M outside the above-described prescribed range.

Terminals T1 to T16

The terminals T1 to T16 make the piezoelectric drive circuits A1, A2, A4, B1, B2, and B4 and the forced piezoelectric drive circuits A3 and B3 to apply a voltage. To prescribed ones of the terminals T1 to T16, power supplies 31 to 34 of the power source 60 are coupled through ammeters 41 to 44. The piezoelectric drive circuits A1, A2, B1, and B2 are driven by these power supplies 31 to 34, and the forced piezoelectric drive circuits A3 and B3 are driven by a forced power source 35 (see FIG. 2). Note that the forced power source 35 is omitted in FIG. 1.

The forced power source 35 applies a voltage to the forced piezoelectric drive circuits A3 and B3 through a predetermined one of the terminals T1 to T16. In a similar manner, piezoelectric drive circuits A4 and B4 are driven by the power source 60 (see FIG. 1 and FIG. 2), and the power source 60 applies a voltage to the piezoelectric drive circuits A4 and B4 through another prescribed one of the terminals T1 to T16.

Optical Deflection Apparatus 120

Figure 2:
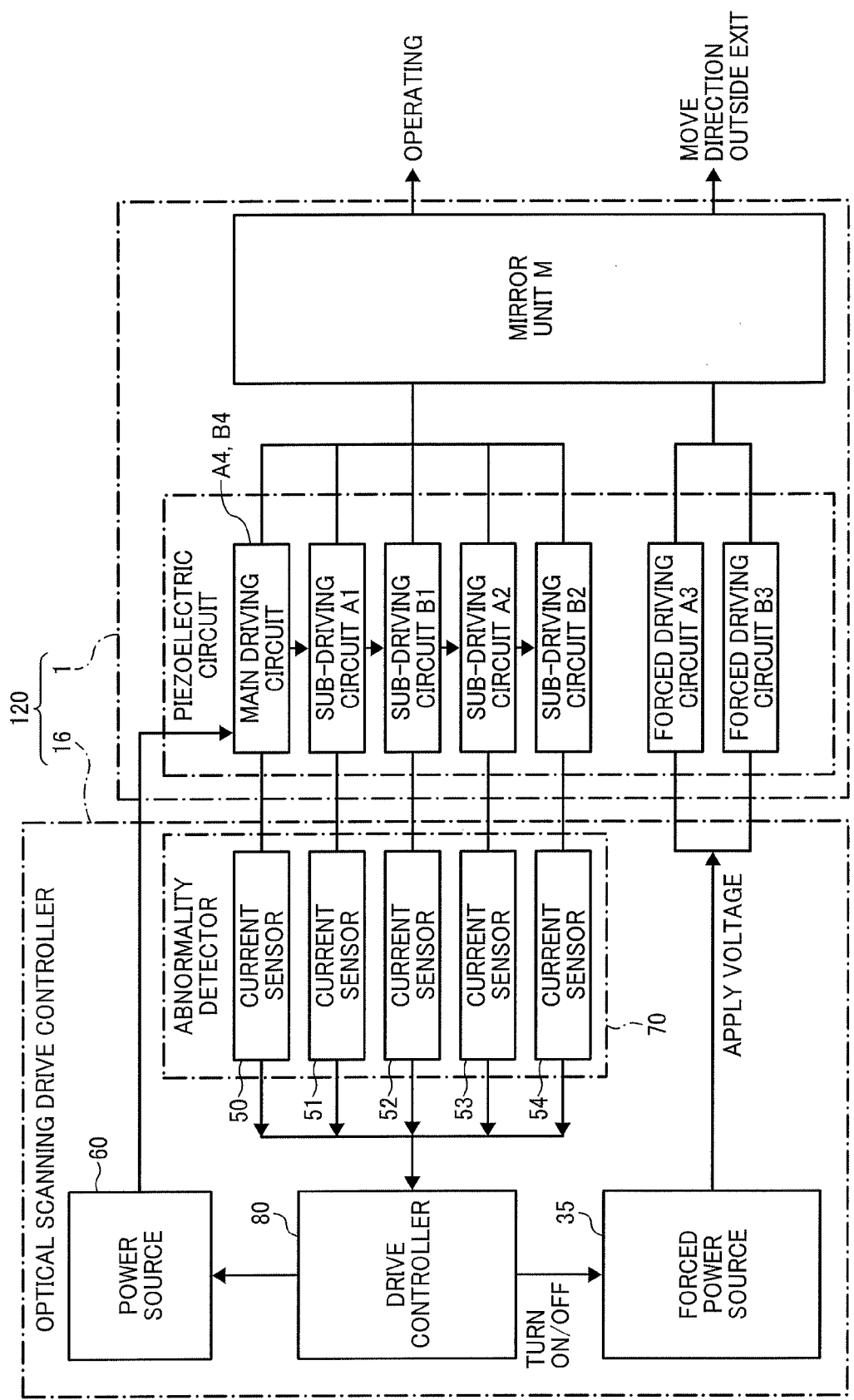
FIG. 2 is a block diagram of an optical deflection apparatus provided with the light deflector illustrated in FIG. 1, according to the first embodiment of the present disclosure.

FIG. 2 is a schematic block diagram of the optical deflection apparatus 120, according to the present embodiment.

The optical deflection apparatus 120 includes the light deflector 1 illustrated in FIG. 1 and an optical scanning drive controller 16.

The optical scanning drive controller 16 includes an abnormality detector 70 that detects an abnormality in the piezoelectric drive circuits A1, A2, B1, B2, A4, and B4, the power source 60, the forced power source 35, and a drive controller 80.

The power source 60 includes the power supplies 31 to 34 (see FIG. 1) to drive the piezoelectric drive circuits A1, A2, B1, B2, A4, and B4. The forced power source 35 drives the forced piezoelectric drive circuits A3 and B3. The drive controller 80 is implemented by, for example, a central processing unit (CPU), a read only memory (ROM), a random access memory (RAM), and a field programmable gate array (FPGA), and controls the operation of the power source 60 and the forced power source 35 based on an externally input signal or the like.

Abnormality Detector 70

The abnormality detector 70 includes a current sensor (first abnormality detector) 50 and current sensors (second abnormality detector) 51 to 54. The current sensor 50 senses the current flowing through the piezoelectric drive circuits A4 and B4, which serve as a main driving circuit, to detect an abnormality.

The current sensors 51 to 54 detect an abnormality in the piezoelectric drive circuits A1, A2, B1, and B2 that serve as sub driving circuits. More specifically, the current sensors 51 to 54 detect an abnormality based on the current flowing through the ammeters 41 to 44, i.e., an electric potential difference occurring at both ends of the resistor. In a similar manner, the current sensor 50 also senses an electric potential difference occurring at both ends of the resistor to detect an abnormality in the piezoelectric drive circuits A4 and B4.

Drive Controller 80

The drive controller 80 controls the power source 60 to oscillate the mirror unit M of the light deflector 1 in the X-axis direction (see FIG. 1) and the Y-axis direction. Accordingly, the laser beam incident on the mirror unit M of the light deflector 1 performs scanning (deflection) in the X direction and Y direction. In the present embodiment, the mirror supporting members 6A and 6B and the piezoelectric drive circuits A4 and B4 serve as a first actuator that drives the mirror unit M around an axis parallel to the X-axis (i.e., around the Y-axis), and the elastic members 3 and 4 and the piezoelectric drive circuits A1, A2, B1, and B2 serve as a second actuator that drives the mirror unit M around an axis parallel to the Y-axis (i.e., around the X-axis).

When the abnormality detector 70 detects an abnormality, the drive controller 80 turns on the forced power source 35 to drive the forced piezoelectric drive circuits A3 and B3 (i.e., the forced driving circuits).

In this configuration, the forced piezoelectric drive circuits A3 and B3 and the bases 5A and 5B serve as a third actuator that drives the mirror unit M.

Figure 5:
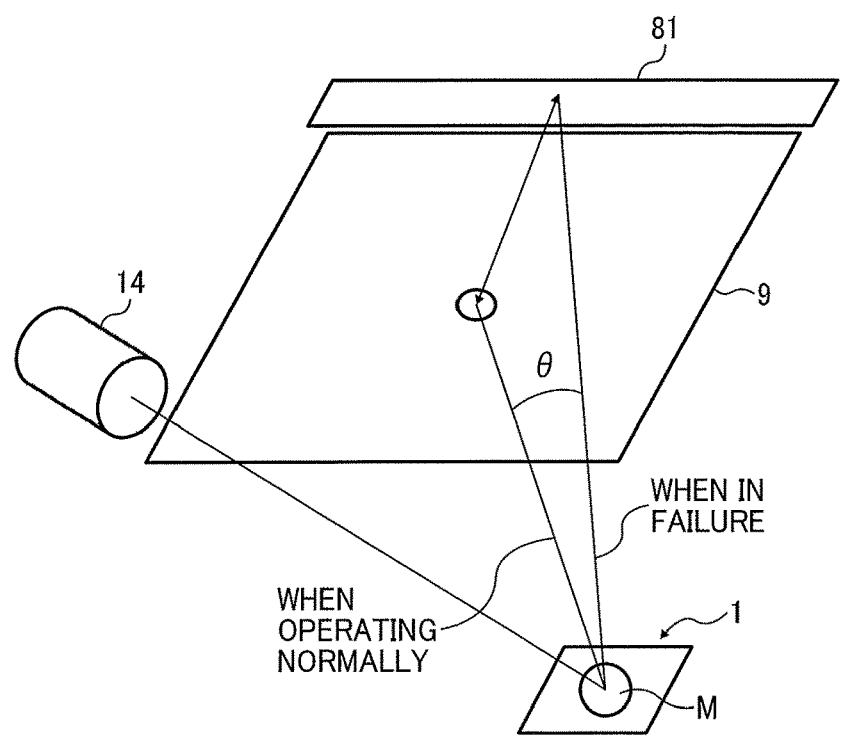
FIG. 5 is a schematic view of a state where a laser beam is deflected outside an exit under abnormal operating conditions, according to an embodiment of the present disclosure.

When the forced piezoelectric drive circuits A3 and B3 are driven, the bases 5A and 5B elastically deform, and the laser beam incident on the mirror unit M does not move out of a prescribed range, i.e., the exit 9 of the laser beam (see FIG. 5).

Operation of Optical Deflection Apparatus 120

Next, the operation of the optical deflection apparatus 120 as configured above is described.

When a start-up switch is operated, the drive controller 80 controls the power source 60 to output a driving voltage of a prescribed drive frequency to drive the piezoelectric drive circuits A4 and B4, so as to rotate the mirror unit M around the Y-axis. Moreover, the drive controller 80 controls the power source 60 such that the power supplies 31 to 34 output a driving voltage of a prescribed drive frequency to drive the piezoelectric drive circuits A1, A2, B1, and B2.

As the piezoelectric drive circuits A1, A2, B1, and B2 are driven, the mirror unit M rotates around the X-axis. Then, as the mirror unit M rotates around the Y-axis and X-axis, the laser beam incident on the mirror unit M is reflected by the mirror unit M and perform scanning within a prescribed range in the X direction and Y direction (normal operation).

Figure 3:
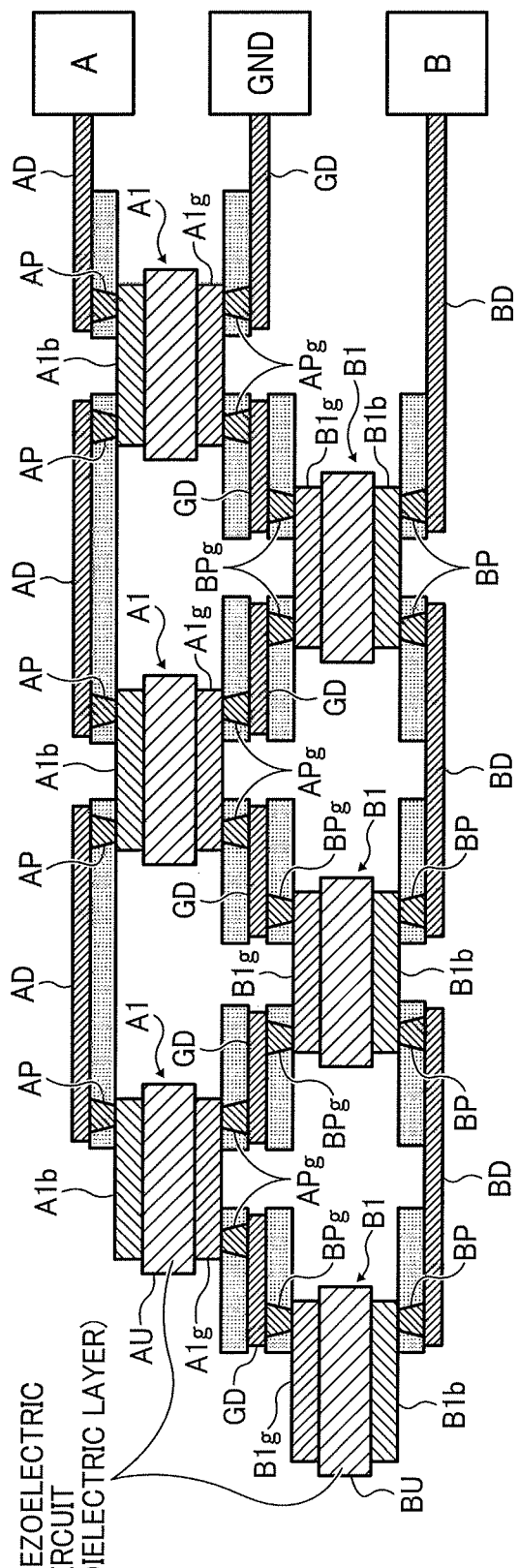
FIG. 3 is a schematic view of how electrode plates of a piezoelectric drive circuit are joined together, according to an embodiment of the present disclosure.

FIG. 3 is a schematic view of how electrode plates of the piezoelectric drive circuits A1 and B1 are joined together, according to the present embodiment.

The piezoelectric drive circuits A1 and B1 include electrode plates A1$b$ and B1$b$, respectively, and these electrode plates A1$b$ and B1$b$ are coupled to each other in series via wiring AD and BD wired through contact holes AP and BP. The piezoelectric drive circuits A1 and B1 also include electrode plates A1$g$ and B1$g$ for grounding, respectively, and these electrode plates A1$g$ and B1$g$ are coupled to each other in series via wiring GD wired through contact holes APg and BPg.

The piezoelectric drive circuits A1 and B1 include piezoelectric films (piezoelectric elements) AU and BU, and these piezoelectric films AU and BU serve as dielectric layers. The piezoelectric films AU and BU have high resistance as known in the art, but when age deterioration over time or initial failures are present, the piezoelectric circuits may short out due to an internal defect, resulting in failure. In particular, such failure tends to occur when the unit is mounted in a vehicle, and therefore subjected to high temperatures.

As a mode of failure, the adhesion between the electrode plates A1b, A1g, B1b, and B1g, and piezoelectric films AU and BU may deteriorate and the compressive stress against the piezoelectric films AU and BU may become uneven. Moreover, a crack may exist inside the piezoelectric films AU and BU as initial failures and, the crack may grow as the piezoelectric films AU and BU repeat expanding and contracting. Further, polarization may be uneven at some portions as initial failures, and the internal stress during operation may increase.

As an electric current concentrates at a joint between the wiring AD, BD, and GD and the electrode plates A1b, B1b, and B1g, the amount of heat generation is large at such a joint, and thus such a large amount of heat may cause a short at the wiring AD, BD, and GD.

Such failure may occur in a similar manner at the piezoelectric drive circuits A2 and B2 and the piezoelectric drive circuits A4 and B4.

When a failure occurs as described above, the power supply to the piezoelectric films AU and BU stops. When an electrode plate for grounding the piezoelectric drive circuits A4 and B4 serves as a ground in common due to wiring GD, the power supply from the piezoelectric drive circuits A4 and B4 to a piezoelectric film also stops due to such a failure as described above, and the operation of the mirror unit M stops.

When the operation of the mirror unit M stops, a particular spot within a prescribed scanning range keeps being irradiated with a laser beam, which is undesirable.

However, when such a failure occurs as described above, the value of the current increases to a larger degree and the values of the current that the current sensors 51 to 54 detect the increase in the case of a short circuit, and the detected values of the current become zero in the case of disconnection.

When any one of the currents flowing through the piezoelectric drive circuits A1, A2, B1, B2, A4, and B4 fluctuates widely due to the variations in the voltage applied to the piezoelectric drive circuits A1, A2, B1, B2, A4, and B4, the drive controller 80 detects an abnormality. For example, the drive controller 80 detects an abnormality, for example, when the fluctuation is equal to or greater than 10% with reference to the values of the current when a voltage is initially applied.

Figure 4A:
FIG. 4A is a schematic view of relative positions of a mirror unit and two bases under normal operating conditions, according to an embodiment of the present disclosure.

FIG. 4A is a schematic view of the relative positions of the mirror unit M and the bases 5A and 5B under normal operating conditions, according to the present embodiment.

Figure 4B:
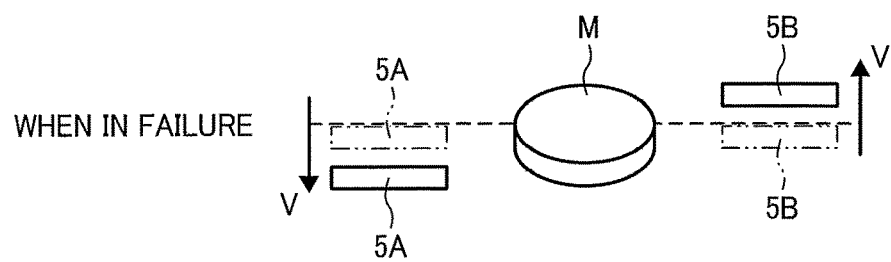
FIG. 4B is a schematic view of relative positions of a mirror unit and two bases under abnormal operating conditions, according to an embodiment of the present disclosure.

FIG. 4B is a schematic view of the relative positions of the mirror unit M and the bases 5A and 5B under abnormal operating conditions, according to the present embodiment.

When the drive controller 80 detects an abnormality, the drive controller 80 turns on the forced power source 35 to control the forced piezoelectric drive circuits A3 and B3 (see FIG. 1) to apply a driving voltage. Accordingly, the forced piezoelectric drive circuits A3 and B3 are driven, and the bases 5A and 5B elastically deform from a position illustrated in FIG. 4A to a position illustrated in FIG. 4B. Due to such an elastic deformation, the mirror unit M inclines to a large degree as illustrated in FIG. 4B. For example, positive voltage is applied to an electrode of the forced piezoelectric drive circuit A3 on one side, and negative voltage is applied to an electrode of the forced piezoelectric drive circuit B3 on one side. Accordingly, as illustrated in FIG. 4A and FIG. 4B, the base 5A elastically deforms downward, and the base 5B elastically deforms upward. As a result, the mirror unit M inclines to a large degree.

FIG. 5 is a schematic view of a state where a laser beam is deflected outside an exit under abnormal operating conditions, according to the present embodiment.

As illustrated in FIG. 5, due to the inclination of the mirror unit M, the laser beam that is reflected by the mirror unit M is moved (deflected) to a laser beam detection charge-coupled device (CCD) 81 that falls outside a predetermined scanning range, i.e., the exit (prescribed range) 9. In other words, the laser beam is deflected outside a prescribed range. In FIG. 5, an optical system 14 irradiates the mirror unit M with the laser beam emitted from a laser beam source. As the laser beam is deflected onto the laser beam detection CCD 81, which is outside the prescribed range, whether the laser beam source is turned on or turned off can be determined according to a signal sent from the laser beam detection CCD 81.

In the present embodiment, the relation between the amount of displacement of the bases 5A and 5B and the inclination of the mirror unit M is determined by the distance from the center of the mirror unit M to the forced piezoelectric drive circuits A3 and B3 of the bases 5A and 5B. Note also that the center of the mirror unit M matches the midpoint position between the base 5A and the base 5B. For example, when the distance is 1 millimeters (mm), the amount of displacement of the forced piezoelectric drive circuits A3 and B3 is "tanθ". Accordingly, for example, when the mirror unit M is inclined by θ=10 (degrees) and the laser beam is deflected outside the exit 9, it is desired that the forced piezoelectric drive circuits A3 and B3 be displaced by 0.17 mm.

As described above, when an abnormality is detected in any one of the piezoelectric drive circuits A1, A2, B1, B2, A4, and B4, the forced piezoelectric drive circuits A3 and B3 are driven to elastically deform the bases 5A and 5B in a forced manner. Due to such a configuration, the laser beam incident on the mirror unit M can be deflected outside a prescribed range in a way different from the normal operation, and a trouble can be prevented in which a particular spot within a prescribed scanning range keeps being irradiated with a laser beam.

Moreover, a configuration, in which the forced piezoelectric drive circuits A3 and B3 are provided for the light deflector 1 to elastically deform the bases 5A and 5B to deflect the laser beam incident on the mirror unit M outside a prescribed range, is so simple that the optical deflection apparatus 120 can be produced at low cost.

In the embodiment described above, an apparatus is described in which the light deflector 1 that performs two-dimensional scanning in the X direction and Y direction is provided with the forced piezoelectric drive circuits A3 and B3. However, no limitation is indicated thereby and such an apparatus may be applied to a light deflector that performs one-dimensional scanning.

ALTERNATIVE EMBODIMENT

Figure 6:
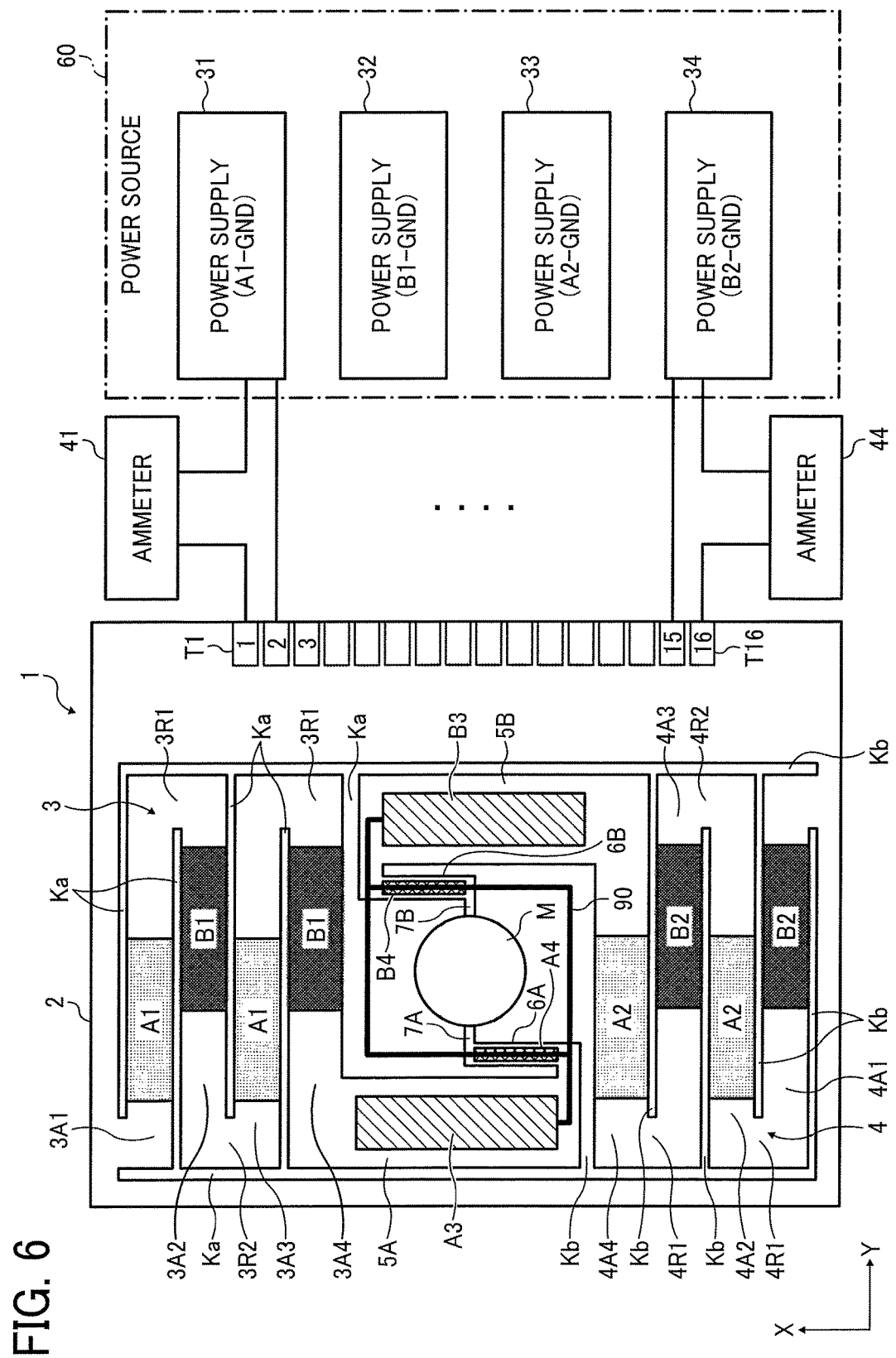
FIG. 6 is a plan view of a light deflector according to an alternative embodiment of the present disclosure.

FIG. 6 is a plan view of the light deflector 1 according to an alternative embodiment.

In the light deflector 1 illustrated in FIG. 6, the bases 5A and 5B and the mirror supporting members 6A and 6B are reinforced by a rib (reinforcement member) 90 so as to be maintained on a same plane. Such a configuration is proposed to handle cases in which the stiffness of the substrate 2 of the light deflector 1 is insufficient due to the structure where the mirror supporting members 6A and 6B incline as the bases 5A and 5B elastically deform. If the stiffness of the substrate 2 of the light deflector 1 is insufficient, the mirror supporting members 6A and 6B may be twisted. In the present alternative embodiment, the rib 90 reinforces the structure to avoid the above circumstances.

SECOND EMBODIMENT

Figure 7:
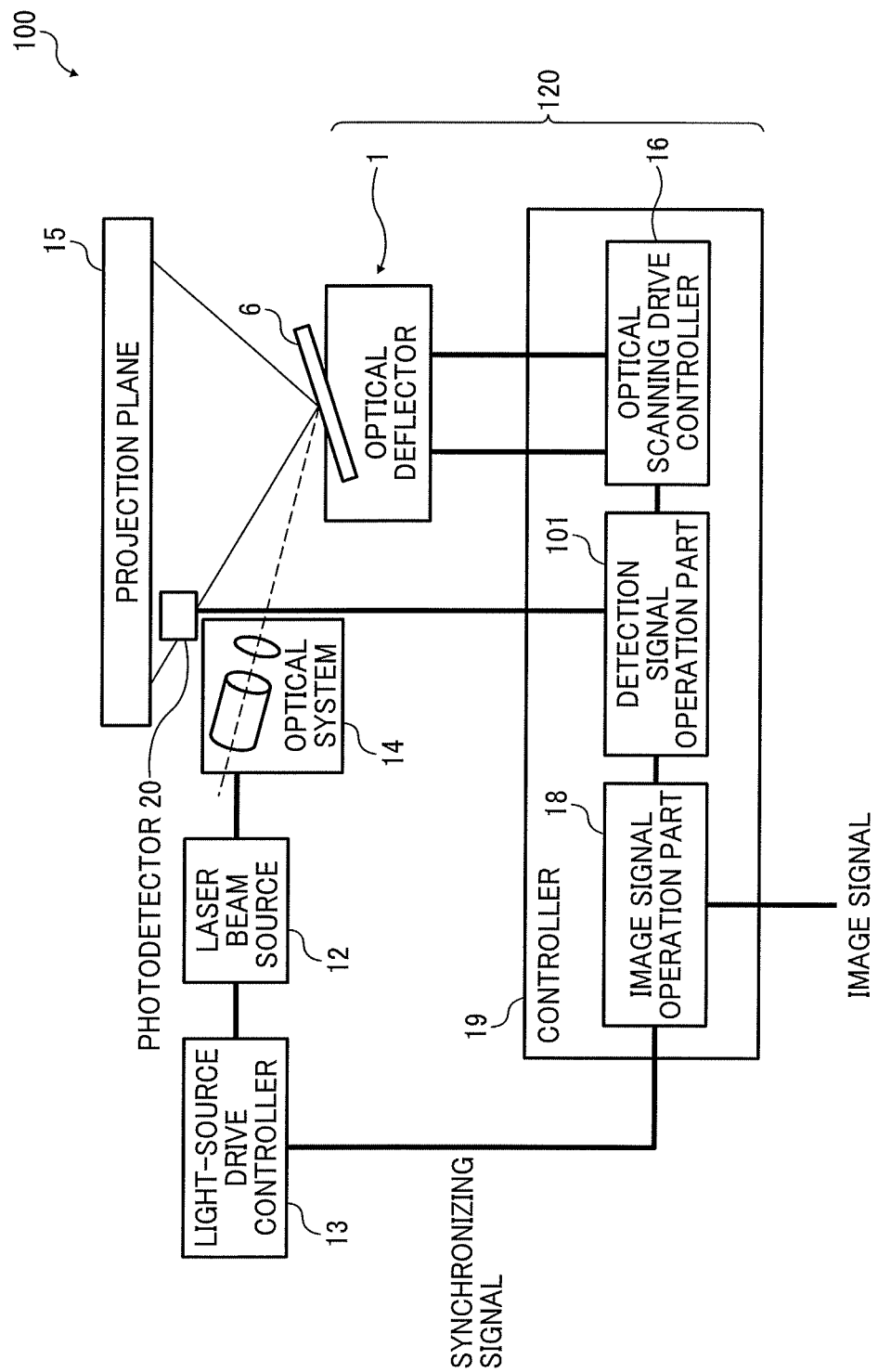
FIG. 7 is a block diagram of a heads-up display according to a second embodiment of the present disclosure.

FIG. 7 is a block diagram of a heads-up display (HUD) 100 provided with the optical deflection apparatus 120, according to a second embodiment.

The heads-up display 100 according to the second embodiment includes the light deflector 1, a laser beam source 12 that emits a laser beam, a light-source drive controller 13 that controls the laser beam source 12, an optical system 14, a controller 19, and a photodetector 20.

The light-source drive controller 13 controls, for example, the on-off of the laser beam source 12, based on an image signal or synchronizing signal sent from the controller 19.

The controller 19 includes an image signal operation part 18, a detection signal operation part 101, and an optical scanning drive controller 16.

The image signal operation part 18 separates a horizontal synchronizing signal and a vertical synchronizing signal from an image signal.

The detection signal operation part 101 calculates a timing at which the photodetector 20 received the laser beam scanned by the mirror unit M (see, for example, FIG. 1).

The optical scanning drive controller 16 controls the oscillation of the mirror unit M of the light deflector 1 around the Y-axis such that the horizontal synchronizing signal sent from the image signal operation part 18 matches the timing, calculated by the detection signal operation part 101, at which the photodetector 20 received the laser beam. Moreover, the optical scanning drive controller 16 controls the oscillation of the mirror unit M of the light deflector 1 around the X-axis, based on a vertical synchronizing signal.

In the present embodiment, the light deflector 1 and the optical scanning drive controller 16 of the controller 19 together configure an optical deflection apparatus 120 similar to the optical deflection apparatus 120 according to the first embodiment. The operation of the optical deflection apparatus 120 according to the present embodiment is similar to that of the first embodiment, and thus its description is omitted.

In the heads-up display 100, scanning is performed in the main scanning direction and the sub-scanning direction by the reflected laser beam emitted from the optical system 14 due to the oscillation of the mirror unit M of the light deflector 1 around the Y-axis and the X-axis. Accordingly, the image of an image signal input to the image signal operation part 18 is projected onto a projection plane 15.

Due to the provision of the optical deflection apparatus 120, the heads-up display 100 achieves effects similar to those achieved by the first embodiment. More specifically, when an abnormality is detected in any one of the piezoelectric drive circuits A1, A2, B1, B2, A4, and B4 (see FIG. 1), the forced piezoelectric drive circuits A3 and B3 elastically deform the bases 5A and 5B to deflect the laser beam incident on the mirror unit M outside a prescribed range. Due to such a configuration, a particular spot of the projection plane 15, which is a prescribed scanning range, can be prevented from being irradiated with a laser beam continuously.

THIRD EMBODIMENT

Figure 8:
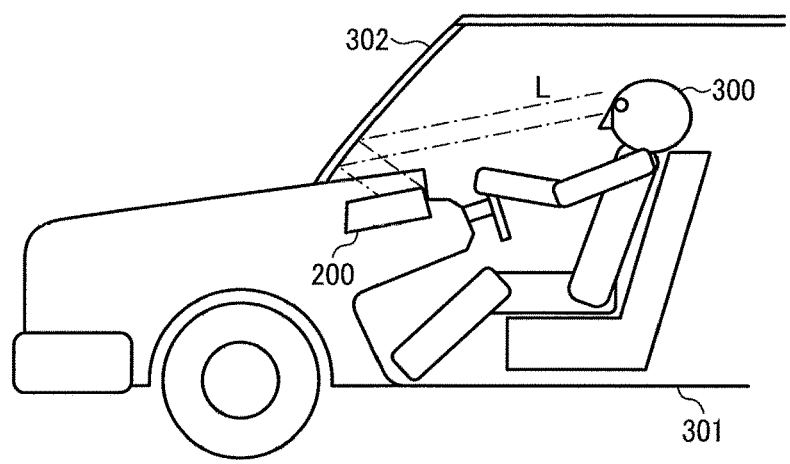
FIG. 8 is a schematic diagram of a vehicle mounting a heads-up display provided with an optical deflection apparatus, according to a third embodiment.

FIG. 8 is a schematic diagram of a vehicle mounting an image projector provided with the light deflector 1, according to a third embodiment.

In the present embodiment, the image projector will be referred to as a heads-up display (HUD) 200.

Figure 9:
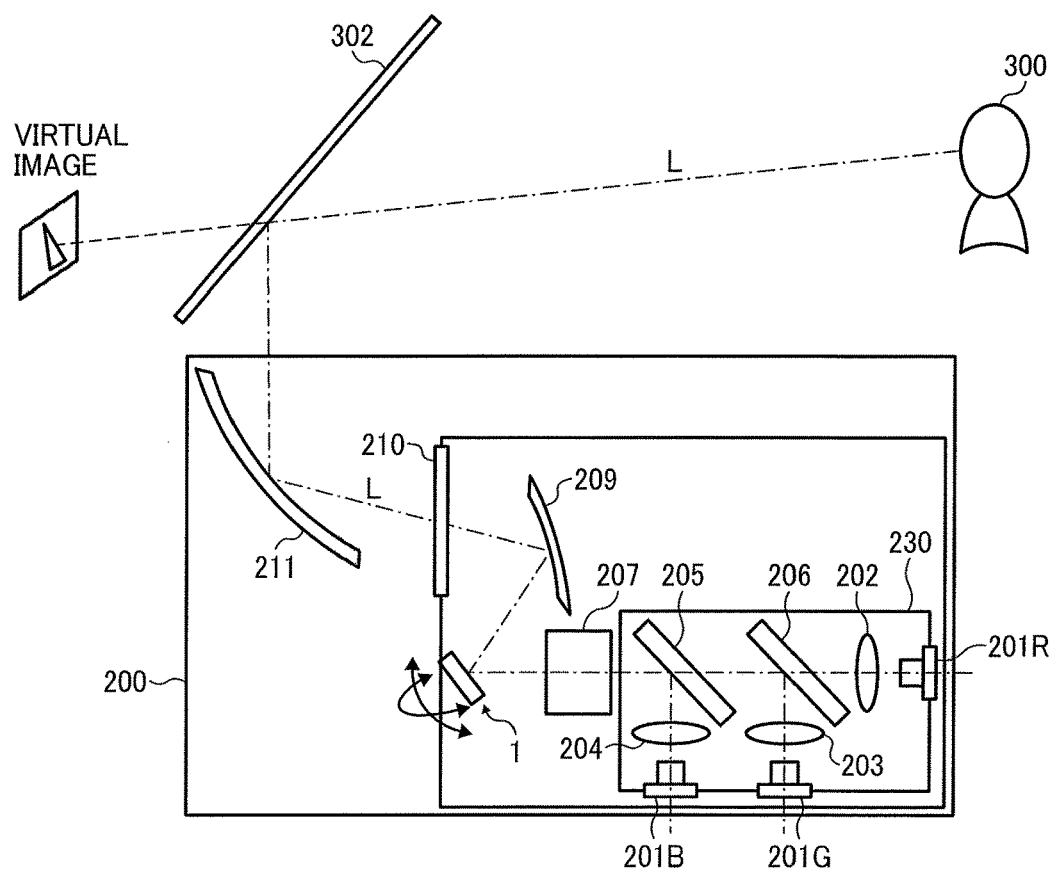
FIG. 9 is a diagram illustrating an optical arrangement of a heads-up display illustrated in FIG. 8, according to an embodiment of the present disclosure.

FIG. 9 is a schematic diagram of the internal structure of the heads-up display 200 according to the present embodiment.

The heads-up display 200 according to the third embodiment is disposed, for example, in the dashboard of a car 301, as illustrated in FIG. 8. A projection light L, which is the light for projecting an image, that is emitted from the heads-up display 200 disposed in the dashboard is reflected by a front windshield 302, and is headed for a user. In the present embodiment, the user is also referred to as observer or a driver 300. Accordingly, the driver 300 can visually recognize an image projected by the heads-up display 200 as a virtual image. Note that a combiner may be disposed on the inner wall of the front windshield 302, and the user may visually recognize a virtual image formed by the projection light L that is reflected at the combiner.

The heads-up display 200 according to the third embodiment includes, as illustrated in FIG. 9, red, green, and blue laser beam sources 201R, 201G, and 201B, collimator lenses 202, 203, and 204 that are provided for the laser beam sources 201R, 201G, and 201B, respectively, two dichroic mirrors 205 and 206, a light quantity adjuster 207, the light deflector 1, a free-form surface mirror 209, a screen 210, and a projector mirror 211. A light source unit 230 according to the present embodiment includes the laser beam sources 201R, 201G, and 201B, the collimator lenses 202, 203, and 204, and the dichroic mirrors 205 and 206, and these elements are unitized by an optical housing.

The heads-up display 200 according to the present embodiment projects the intermediate image formed on the screen 210 (corresponding to the projection plane 15 illustrated in FIG. 7) onto the front windshield 302 of the car 301, such that the driver 300 can visually recognize the intermediate image as a virtual image. The laser beams of the RGB colors that are emitted from the laser beam sources 201R, 201G, and 201B are approximately collimated by the collimator lenses 202, 203, and 204, respectively, and are combined by the two dichroic mirrors 205 and 206. The light quantity of combined laser beam is adjusted by the light quantity adjuster 207, and then the adjusted laser beam is two-dimensionally scanned by the light deflector 1. The projection light L that has been two-dimensionally scanned by the light deflector 1 is reflected by the free-faun surface mirror 209 so as to correct the distortion, and then is collected and condensed to the screen 210. Accordingly, an intermediate image is displayed. The screen 210 includes a microlens array where a plurality of microlenses are two-dimensionally arranged, and magnifies the projection light L that enters the screen 210 on a microlens-by-microlens basis.

The light deflector 1 is controlled in a similar manner to the first embodiment, and controls the mirror unit M to rotate the mirror unit in a go and return manner in the main scanning direction and sub-scanning direction to two-dimensionally scan (raster-scan) the projection light L incident on the mirror unit M. The light deflector 1 is controlled in synchronization with the timing at which the laser beam sources 201R, 201G, and 201B emit light.

The light source unit 230 according to the third embodiment is equivalent to a unit of the laser beam source 12 (see FIG. 7) and the optical system 14 according to the second embodiment. Moreover, the heads-up display 200 according to the third embodiment is equivalent to the heads-up display 100 according to the second embodiment for which the light quantity adjuster 207, the free-form surface mirror 209, and the projector minor 211 are further provided.

The heads-up display 200 may be installed not only in a vehicle but also in, for example, a mobile object such as an aircraft, ship, and a mobile robot. Alternatively, a heads-up display may be installed in an image projector provided for an immobile object such as a working robot that manipulates an object such as a manipulator without moving out of the site.

In the third embodiment described as above, a heads-up display that serves as an image projector has been described. However, any heads-up display is satisfactory as long as it projects an image upon performing optical scanning with the light deflector 1 according to the first embodiment, and is not limited the embodiments described above. For example, the heads-up display may similarly be applied to, for example, a projector that projects an image on a screen, and a head-mounted display that projects an image on a screen such as a light transmission member provided for a device that an observer wears on his/her head or the like.

Due to the provision of the light deflector 1, effects similar to those achieved by the first embodiment can be achieved according to the third embodiment. More specifically, when an abnormality is detected in any one of the piezoelectric drive circuits A1, A2, B1, B2, A4, and B4 (see FIG. 1), the forced piezoelectric drive circuits A3 and B3 are driven to elastically deform the bases 5A and 5B in a forced manner. Due to such a configuration, the laser beam incident on the mirror unit M can be deflected outside a prescribed range, and a trouble can be prevented in which a particular spot of the screen 210, which is a prescribed scanning range, keeps being irradiated with a laser beam. Accordingly, the laser beam that keeps irradiating a particular spot can be prevented from entering an eye of the driver 300.

FOURTH EMBODIMENT

Figure 10:
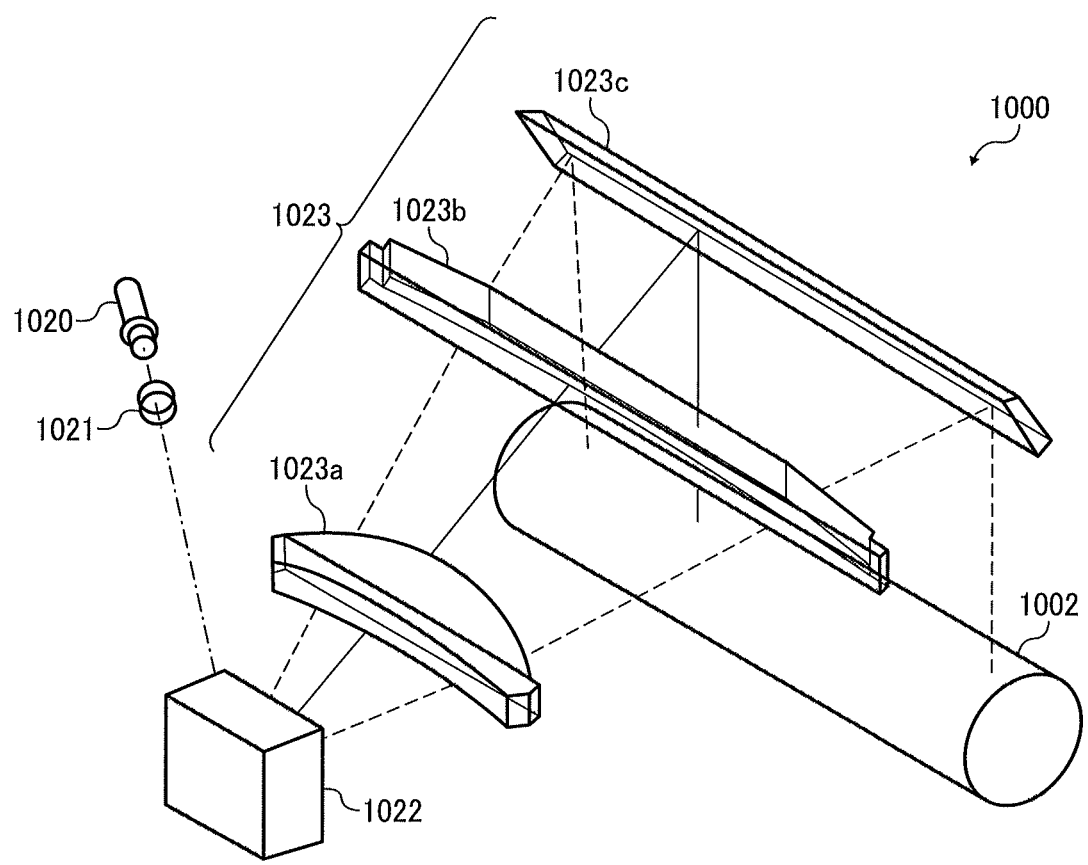
FIG. 10 is a diagram illustrating an optical arrangement of an optical writing unit, according to a fourth embodiment of the present disclosure.

FIG. 10 is a view of an optical writing unit 1000 according to a fourth embodiment. In the optical writing unit 1000 according to the present embodiment, a laser beam that is emitted from a light source unit 1020 such as a laser element passes through an image forming optical system 1021 such as a collimator lens, and is deflected by a light deflector 1022. As the light deflector 1022, the light deflector 1 according to the first embodiment (see FIG. 1) is used, and the optical deflection apparatus 120 according to the first embodiment (see FIG. 2) is also adopted. In such a configuration, only the piezoelectric drive circuits A4 and B4 for the mirror supporting members 6A and 6B of the light deflector 1 (1022) are controlled and driven by the optical scanning drive controller 16 such that the reflected laser beam performs scanning only in the main scanning direction. As the light deflector 1022, the light deflector 1 according to the alternative embodiment (see FIG. 6) may also be used.

The laser beam that is deflected by the light deflector 1022 then passes through a scanning optical system 1023 including a first lens 1023a, a second lens 1023b, and a reflecting mirror unit 1023c, and irradiates a to-be-scanned-by-beam surface, i.e., the to-be-scanned surface, of the photoconductor drum 1002. The scanning optical system 1023 concentrates the light beam onto the to-be-scanned-by-beam surface, i.e., the to-be-scanned surface, in a state of spot.

Each electrode of the piezoelectric circuits of the light deflector 1022 is electrically connected to a mirror driver such as an external power supply, and the mirror driver applies a driving voltage between the lower electrode and the upper electrode of the piezoelectric circuit to drive the light deflector 1022. Accordingly, the mirror unit of the light deflector 1022 rotates in a go and return manner and the laser beam is deflected, and the to-be-scanned-by-beam surface, i.e., the to-be-scanned surface, of the photoconductor drum 1002 is optically scanned.

As described above, the optical writing unit 1000 according to the present embodiment can be used as an optical writing unit for an image forming apparatus such as a photo-printing printer or a copier where a photoconductor is used. By modifying the scanning optical system so as to enable not only uniaxial optical scanning but also biaxial optical scanning, the optical writing unit 1000 according to the present embodiment may be used as a component of the optical scanner of a laser labelling apparatus where a thermal medium is irradiated with a deflected laser beam and printing is done by heating.

In the fourth embodiment, the light deflector 1 illustrated in FIG. 1 is used. However, no limitation is indicated thereby and a light deflector may be adopted that is dedicated to make the reflected laser beam perform scanning only in the main scanning direction.

According to the fourth embodiment, the optical writing unit 1000 uses the optical deflection apparatus 120 (see FIG. 2) provided with the light deflector 1, in a similar manner to the first embodiment. More specifically, when an abnormality is detected in any one of the piezoelectric drive circuits A1, A2, B1, B2, A4, and B4 (see FIG. 1), the forced piezoelectric drive circuits A3 and B3 are driven to elastically deform the bases 5A and 5B to deflect the laser beam incident on the mirror unit M outside a prescribed range. Due to such a configuration, a particular spot of the photoconductor drum 1002 can be prevented from being irradiated with a laser beam continuously.

FIFTH EMBODIMENT

Figure 11:
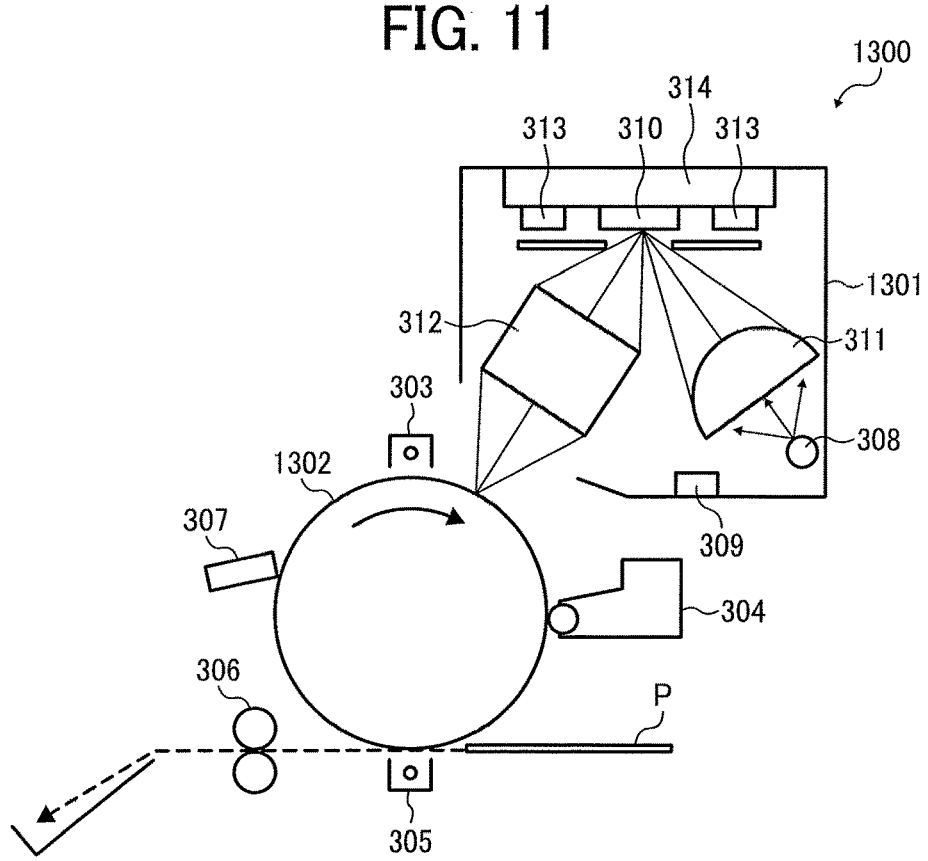
FIG. 11 is a schematic diagram illustrating a general configuration of image forming apparatus, according to a fifth embodiment of the present disclosure.

FIG. 11 is a view of image forming apparatus 1300 according to a fifth embodiment for which the optical writing unit according to the fourth embodiment is provided.

In the image forming apparatus 1300 according to fifth embodiment illustrated in FIG. 11, an optical writing unit 1301 emits a laser beam to a to-be-scanned surface to write an image thereon. A photoconductor drum 1302 is an image bearer that serves as a surface to be scanned by the optical writing unit 1301. The optical writing unit 1301 scans the surface (i.e., to-be-scanned surface) of the photoconductor drum 1302 using a single or a plurality of laser beams modulated by a recording signal, in the axial direction of the photoconductor drum 1302. The photoconductor drum 1302 is driven to rotate in the direction indicated by the arrow, and the surface that is charged by a charger 303 is optically scanned by the optical writing unit 1301. Accordingly, an electrostatic latent image is formed. The electrostatic latent image is rendered visible by a developing device 304 as a toner image, and the developed toner image is transferred onto a recording paper P at a transfer unit 305. The transferred toner image is fixed by a fixing unit 306 onto the recording paper P. The residual toner on the surface that has passed through the transfer unit 305 of the photoconductor drum 1302 is removed by a cleaning unit 307. A belt type photoconductor may be used in place of the photoconductor drum 1302. An intermediate transfer system may be adopted in which a toner image is temporarily transferred to a transfer medium other than a recording paper and the toner image is transferred from the transfer medium to a recording paper and is fixed.

The optical writing unit 1301 includes, for example, a light source 308 that emits a single or a plurality of laser beams modulated by a recording signal, a light source driver 309 that modulates the light source 308, a light deflector 310 equivalent to the light deflector 1022 according to the previous embodiment, an imaging optical system 311 that forms an image of the laser beam modulated by a recording signal, which is emitted from the light source 308, on the mirror surface of a mirror substrate the light deflector 310, and a scanning optical system 312 that forms an image of a single or a plurality of laser beams reflected by the mirror surface on the surface (i.e., the to-be-scanned surface) of the photoconductor drum (photoconductor) 1302. The light deflector 310 is mounted on a substrate 314 together with an integrated circuit 313 that drives the light deflector 310, and is integrated into the optical writing unit 1301.

The integrated circuit 313 includes the optical scanning drive controller 16 illustrated in FIG. 2, and the light deflector 310 has a configuration similar to that of the light deflector 1 according to the first embodiment. The light deflector 310 is controlled in a similar manner to the first embodiment.

The light deflector 310 according to the present embodiment requires less power to operate compared with a polygon mirror, and thus is advantageous in terms of reduced power consumption of an image forming apparatus. The light deflector makes a smaller wind noise when the mirror substrate oscillates compared with a polygon mirror, and thus is advantageous in achieving low noise of an image forming apparatus. The optical deflection apparatus requires much smaller footprint than that of a polygon mirror, and the amount of heat generated by the light deflector 310 is small. Accordingly, downsizing is easily achieved, and thus the optical deflection apparatus is advantageous in downsizing the image forming apparatus. Note that the conveyance system of the recording paper, the driving mechanism of the photoconductor drum, the controller of the developing device and the transfer unit, and the drive system of the light source unit are similar to those of the conventional image forming apparatus, and thus are omitted.

According to the fifth embodiment, the light deflector 310 has a configuration similar to that of the light deflector 1 according to the first embodiment, and the light deflector 310 is controlled in a similar manner to the first embodiment. More specifically, when an abnormality is detected in any one of the piezoelectric drive circuits A1, A2, B1, B2, A4, and B4 (see FIG. 1), the forced piezoelectric drive circuits A3 and B3 are driven to elastically deform the bases 5A and 5B to deflect the laser beam incident on the mirror unit M outside a prescribed range. Due to such a configuration, a trouble can be prevented in which a particular spot of the photoconductor drum 1302 keeps being irradiated with a laser beam.

SIXTH EMBODIMENT

Figure 12:
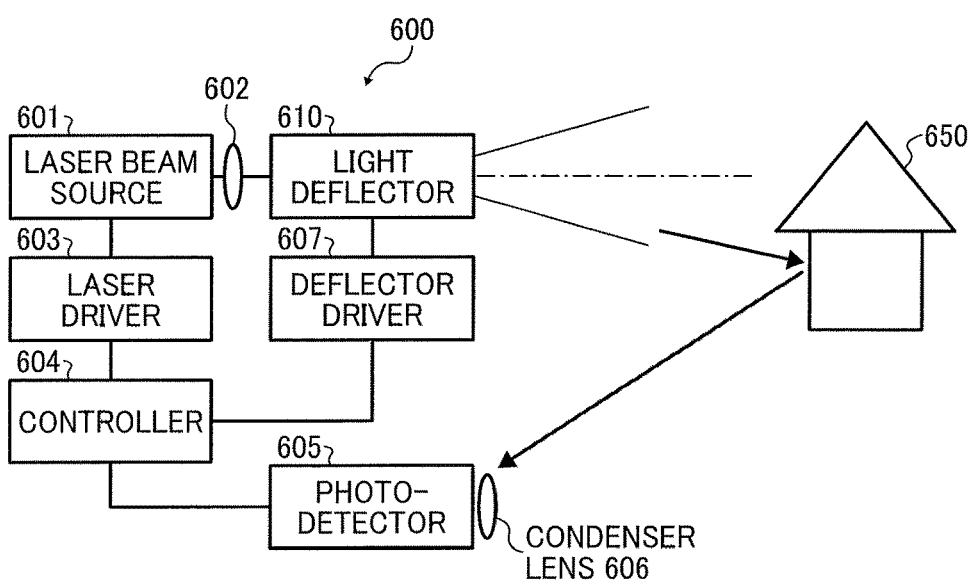
FIG. 12 is a block diagram of an object recognition device according to a sixth embodiment of the present disclosure.

FIG. 12 is a view of an object recognition device 600 according to a sixth embodiment for which the light deflector according to the first embodiment is provided.

More specifically, FIG. 12 is a schematic diagram of the object recognition device 600 according to the present embodiment that serves as a laser radar. The object recognition device 600 according to the sixth embodiment uses the light deflector to perform optical scanning with a laser beam (light flux for measurement) towards a target object, and receives the light reflected by the target object to recognize the target object.

As illustrated in FIG. 12, the laser beam that is emitted from a laser beam source 601 passes through a collimator lens 602, which is an optical system for approximately collimating diverging light, and is uniaxially or biaxially scanned by a light deflector 610. Accordingly, an object 650 ahead of the vehicle is irradiated with the laser beam. A photodetector 605 receives the laser beam that is reflected by the object 650 and has passed through a condenser lens 606, and outputs a detection signal. A laser driver 603 that serves as a light source driving circuit drives the laser beam source 601. A deflector driver 607 that serves as a light deflector driving circuit drives the light deflector 610. The light deflector 610 has a configuration similar to that of the light deflector 1 according to the first embodiment.

A controller 604 controls the laser driver 603 and the deflector driver 607, and processes a detection signal output from the photodetector 605. More specifically, the controller 604 calculates the distance from the object 650 based on the time lag between a timing at which the laser beam is emitted and a timing at which the laser beam is received by the photodetector 605. By scanning the laser beam with the light deflector 610, the distance from the object 650 in a one-dimensional or two-dimensional area can be obtained. As described above, a laser radar with the light deflector 610 that is insusceptible to damage can be provided. The object recognition device 600 as described above may be attached, for example, to a front side of a vehicle, and is used to monitor an area ahead of the vehicle and recognize whether or not an obstacle is present ahead of the vehicle.

Note also that the controller 604 and the deflector driver 607 together configure the optical deflection apparatus 120 according to the first embodiment, and the light deflector 610 is controlled by the controller 604 in a similar manner to the first embodiment.

According to the sixth embodiment, the light deflector 610 has a configuration similar to that of the light deflector 1 according to the first embodiment, and the light deflector 610 is controlled by the controller 604 in a similar manner to the first embodiment. Accordingly, effects similar to those achieved by the first embodiment can be achieved according to the sixth embodiment.

More specifically, when an abnormality is detected in any one of the piezoelectric drive circuits A1, A2, B1, B2, A4, and B4 (see FIG. 1), the forced piezoelectric drive circuits A3 and B3 are driven to elastically deform the bases 5A and 5B to deflect the laser beam incident on the mirror unit M outside a prescribed range. Due to such a configuration, a trouble can be prevented in which a particular spot of the object 650 keeps being irradiated with a laser beam.

In the sixth embodiment described as above, a laser radar that serves as an object recognition device has been described. However, such a laser radar is satisfactory as long as it recognizes an object upon performing optical scanning with the light deflector according to the first embodiment or the alternative embodiment and receiving the reflected light, and is not limited the embodiments described above. For example, the laser radar according to the sixth embodiment may be applied to, for example, biometric authentication where a target object is recognized by recording and referring to the data obtained by optically scanning a hand or face, a security sensor that recognizes an incoming object by performing optical scanning in a target direction, and a component of a three-dimensional scanner that outputs three-dimensional data upon recognizing the shape of an object based on the distance data obtained by performing optical scanning Alternatively, the presence or absence of an object or the shape of an object may be recognized from, for example, the changes in wavelength and the light intensity of the reflection light received by a photoreceptor.

The second to sixth embodiments in which optical scanning is performed by the light deflector 1 according to the first embodiment are described as above. However, no limitation is intended thereby and the light deflector 1 according to the first embodiment may be applied to any device or apparatus that deflects light to perform one-dimensional or two-dimensional optical scanning.

For example, abnormalities in the actuators are detected by a current sensor in the embodiments described above. However, a photodetector (for example, a laser beam detection CCD and a photodiode) that is disposed on a to-be-scanned surface of a light deflector may be adopted as an abnormality detector, and abnormalities in the actuators may be detected upon reflecting the laser beam emitted from a laser beam source by the mirror unit M and receiving the reflected laser beam by the photodetector.

Figure 13:
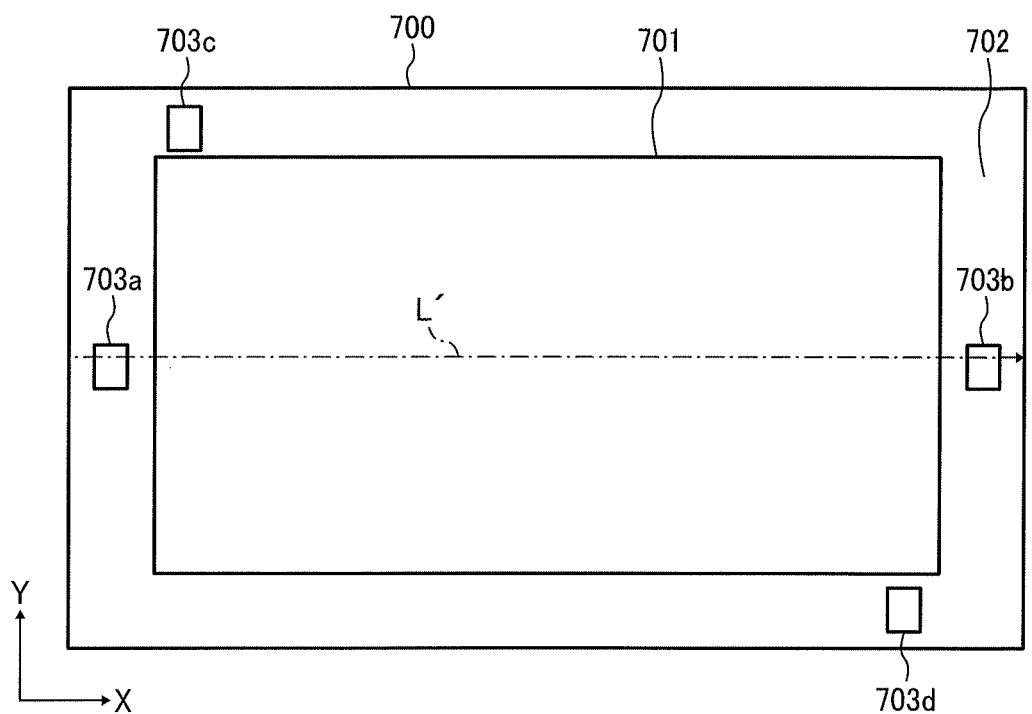
FIG. 13 is a schematic view of a modification where a photoreceptor is disposed as an abnormality detector.

FIG. 13 is a schematic view of a modification where a photoreceptor is disposed as an abnormality detector.

For example, as illustrated in FIG. 13, photodetectors 703a to 703d are disposed on a surface to be scanned by a scanning beam L' emitted from a light deflector (for example, the light deflector 1 according to the first embodiment). More specifically, a scanning area 700 that can be scanned by the light deflector includes a predetermined area 701 (an area from which an image is output) used by the light deflector to draw an image, and an area 702 outside the predetermined area 701, and the photodetectors 703a to 703d are disposed on the area 702. In this configuration, when a predetermined application signal is applied to actuators, a drive controller determines whether both the photodetector 703a and the photodetector 703b have received a laser beam in the main scanning direction (i.e., the X direction in FIG. 13). When the photodetector 703a and the photodetector 703b have failed to receive a laser beam in a predetermined range of application signal, an abnormality is detected in an actuator in the main scanning direction. In the sub-scanning direction (i.e., the Y direction in FIG. 13), the photodetector 703c and the photodetector 703d detects an abnormality in a similar manner to the above. In the present modification, the photodetector 703a and the photodetector 703b serve as a first abnormality detector that detects an abnormality in the main scanning direction, and the photodetector 703c and the photodetector 703d serve as a second abnormality detector that detects an abnormality in the sub-scanning direction.

In the present modification, it is satisfactory as long as an abnormality in an actuator can be detected using a photodetector. For example, when the photodetector 703a receives a laser beam twice, the respective times at which the laser beams are received may be recorded, and an abnormality may be detected when the difference between the time difference and a time difference predetermined for application signals is greater than a threshold.

Figure 14:
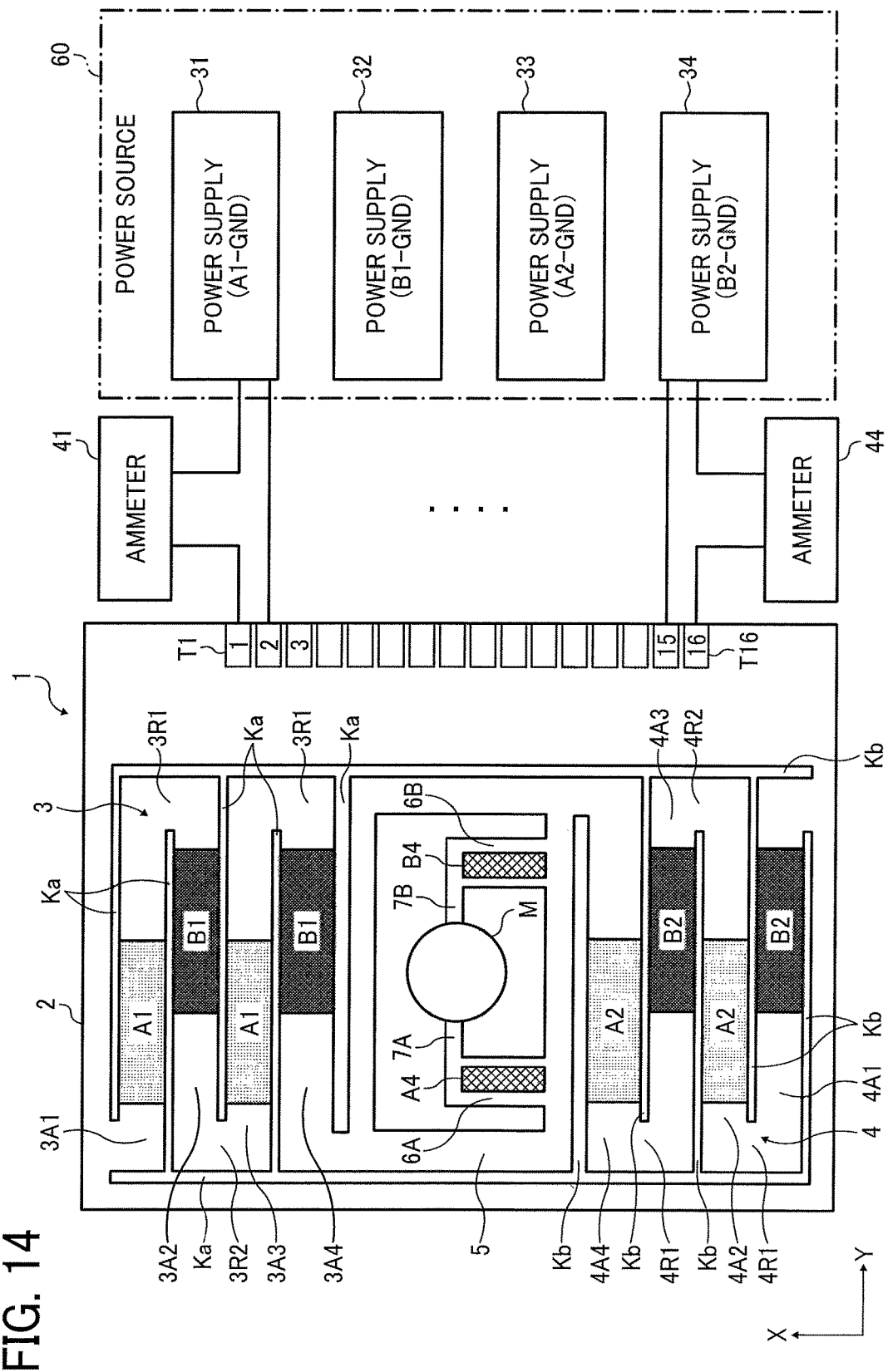
FIG. 14 is a schematic view of a light deflector without a forced piezoelectric drive circuit, according to a modification of the present disclosure.

In the embodiments as described above, a configuration is described in which the forced piezoelectric drive circuit A3 and B3 are provided for the light deflector 1 to deflect the laser beam incident on the mirror unit M outside a prescribed range. However, no limitation is intended thereby. For example, in the light deflector 1 as illustrated in FIG. 14 that performs two-dimensional scanning in the main scanning direction and the sub-scanning direction, a configuration may be adopted in which when a failure is detected in a piezoelectric circuit in the main scanning direction, a piezoelectric circuit in the sub-scanning direction deflects the laser beam incident on the mirror unit M outside a prescribed range. Due to this configuration, without newly installing the forced piezoelectric drive circuits A3 and B3, the laser beam can be deflected outside a prescribed range.

A modification of the light deflector that performs two-dimensional scanning using the multiple actuators as described above, where when an abnormality in one of the actuators is detected, another one of the actuators is used to deflect the laser beam incident on the mirror unit M outside a prescribed range, is described below in detail.

FIG. 14 is a schematic view of the light deflector 1 with no forced piezoelectric drive circuit, according to a modification of the present disclosure.

As illustrated in FIG. 14, the light deflector 1 includes a first actuator (the mirror supporting members 6A and 6B, and the piezoelectric drive circuits A4 and B4) that moves the mirror unit M around an axis parallel to the X-axis, and a second actuator (the elastic members 3 and 4, and the piezoelectric drive circuit A1, A2, B1, and B2) that moves the mirror unit M around an axis parallel to the Y-axis. As the first and second abnormality detectors, the current sensors 50 to 54 may be used in a similar manner to the light deflector 1 according to the first embodiment, or the photodetectors 703a to 703d as illustrated in FIG. 13 may be used.

Figure 15:
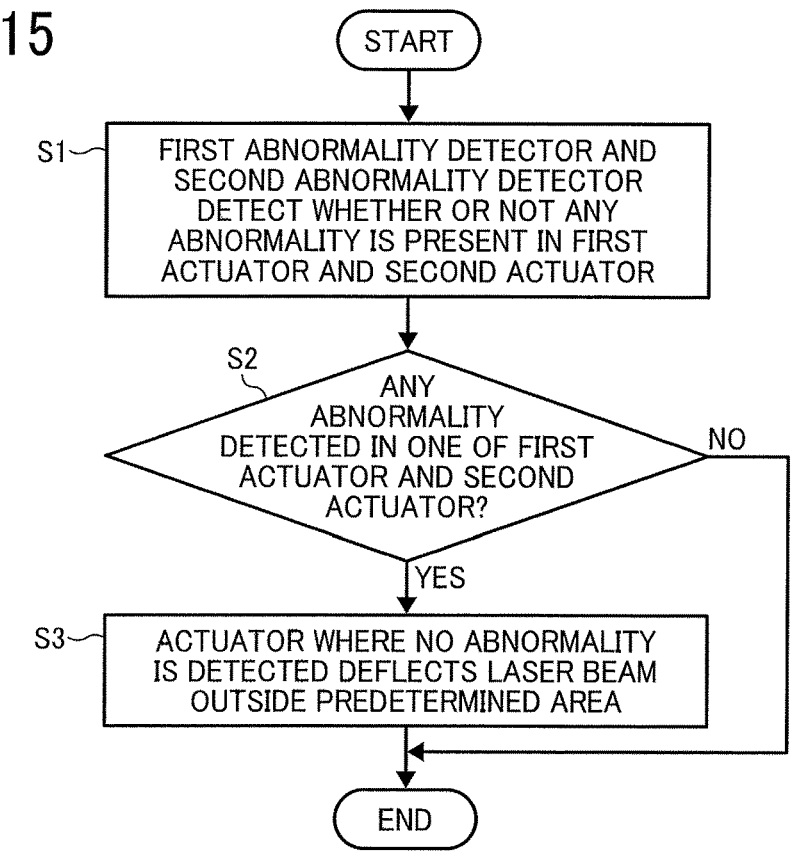
FIG. 15 is a flowchart of abnormality correction processes performed by the light deflector illustrated in FIG. 14, according to an embodiment of the present disclosure.

FIG. 15 is a flowchart of abnormality correction processes performed by the light deflector 1, according to the present embodiment.

As illustrated in FIG. 15, firstly, the first abnormality detector and the second abnormality detector detect whether or not any abnormality is present in the first actuator and the second actuator (step Si). When an abnormality is detected in any one of the first actuator and the second actuator ("YES" in step S2), the other actuator where no abnormality is detected deflects the laser beam outside the predetermined area (step S3). By contrast, when an abnormality is not detected in any one of the first actuator and the second actuator ("NO" in step S2), the abnormality correction processes terminate.

More specifically, when an abnormality in the first actuator is detected by the first abnormality detector and no abnormality in the second actuator is detected by the second abnormality detector, the second actuator makes the mirror unit M incline in the sub-scanning direction, and deflects the laser beam outside the predetermined area.

On the other hand, when an abnormality in the second actuator is detected by the second abnormality detector and no abnormality in the first actuator is detected by the first abnormality detector, the first actuator makes the mirror unit M incline in the main scanning direction, and deflects the laser beam outside the predetermined area. As described above, the laser beam is deflected outside the predetermined area that is likely to affect a device in a subsequent stage, and the laser beam can be prevented from being concentrated onto a particular spot of the predetermined area.

In the present modification, even when the laser beam is deflected outside the predetermined area, it is desired that an actuator with no abnormality detection be used to perform optical scanning so as not to enter the predetermined area. Further, it is desired that photodetectors (for example, the photodetectors 703a to 703d as illustrated in FIG. 13) be included in the optical scanning range. Accordingly, the laser beam can be prevented from being concentrated onto a particular spot outside the predetermined area, and the impact on a component in a subsequent stage can be prevented. Further, the laser beam is received by the photodetectors and the state of the light source can be measured.

In the embodiments described above, a piezoelectric actuator with piezoelectric elements is adopted. However, no limitation is intended thereby. For example, an electromagnetic actuator using electromagnetic force or an electrostatic actuator using electrostatic force may be adopted.

Figure 16:
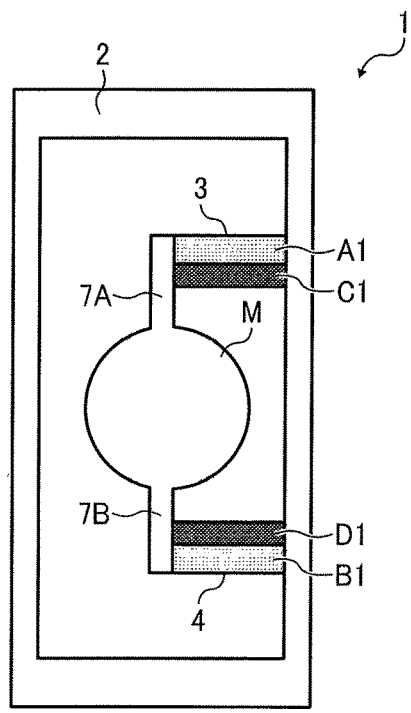
FIG. 16 is a schematic view of a light deflector according to an alternative modification of the present disclosure.

FIG. 16 is a schematic view of a light deflector according to an alternative modification of the present disclosure.

A detection actuator with a piezoelectric detection circuit may separately be provided in addition to an actuator with a piezoelectric drive circuit, and when a drive controller detects an abnormality in the actuator, the piezoelectric detection circuit may be used to perform optical scanning. For example, as in the alternative modification illustrated in FIG. 16, piezoelectric detection circuits C1 and D1 are provided for the elastic members 3 and 4 in parallel with the piezoelectric drive circuits A1 and B1. In this configuration, the piezoelectric drive circuits A1 and B1 and the elastic members 3 and 4 serve as a first actuator that makes the mirror unit M move around a prescribed axis, and the piezoelectric detection circuits C1 and D1 and the elastic members 3 and 4 serve as a detection actuator (second actuator) that makes the mirror unit M move in a way different from the normal operation. Note that the piezoelectric detection circuits C1 and D1 also serve as an abnormality detector. The piezoelectric detection circuit C1 and D1 use piezoelectric effects. With the deformation of the elastic members 3 and 4 as the piezoelectric drive circuits A1 and B1, the piezoelectric detection circuits C1 and D1 deform. Accordingly, an electric charge builds up. The built up electrical charge is monitored to calculate, for example, the amount of curve of the elastic members 3 and 4 and the angle of inclination of a movable part. Further, the drive controller can monitor the elastic members 3 and 4 to detect the sum of the amount of displacement caused by the piezoelectric drive circuits A1 and B1.

In such a configuration, the piezoelectric detection circuits C1 and D1 are coupled to a separate power supply other than the power supplies coupled to the piezoelectric drive circuits A1 and B1, and a separate power supply is coupled to the drive controller. Due to the control of the drive controller, a configuration in which a driving voltage can be applied to the piezoelectric detection circuits C1 and D1 is achieved. Due to this configuration, when an abnormality is detected in the first actuator, the drive controller applies a voltage to the piezoelectric detection circuits C1 and D1 of the second actuator to move the mirror unit M and perform optical scanning. Accordingly, the laser beam can be prevented from being concentrated onto a particular spot of the predetermined area. When optical scanning is performed using the piezoelectric detection circuits C1 and D1, it is desired that an image indicating the occurrence of an abnormality be projected. Due to this configuration, even when the laser beam emitted from a light source cannot be deflected outside the predetermined area, the piezoelectric detection circuits C1 and D1 can still perform optical scanning to prevent the laser beam from being concentrated onto a particular spot, and can project an image indicating the occurrence of an abnormality to notify a user of such an abnormality.

Figure 17:
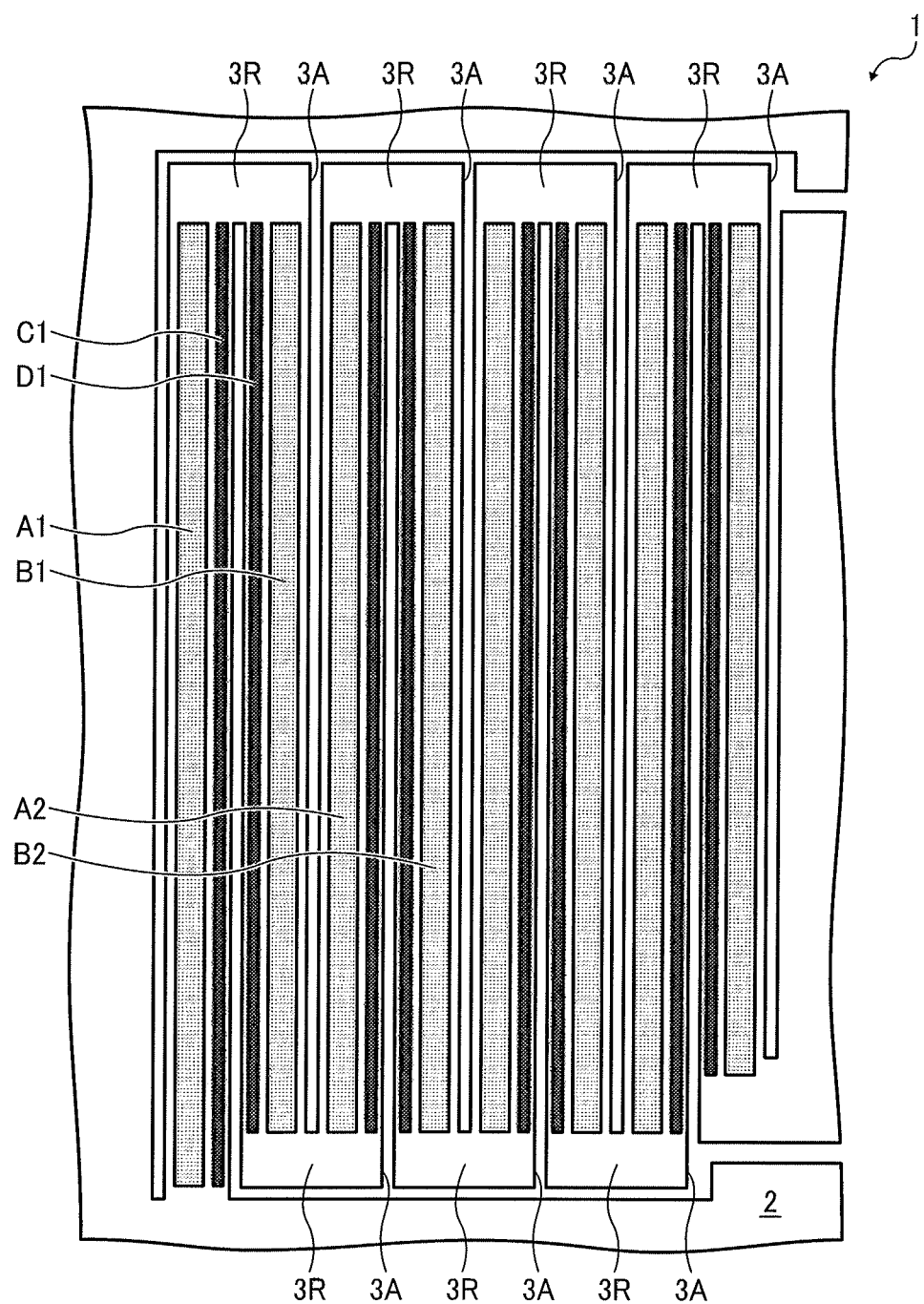
FIG. 17 is a schematic view of a light deflector according to a further alternative modification of the present disclosure.

FIG. 17 is a schematic view of the light deflector 1 according to a further alternative modification of the present disclosure.

As in the light deflector 1 according to the further alternative modification illustrated in FIG. 17, in an actuator where a plurality of beams 3A are joined together at turning portions 3R in a serpentine shape, the piezoelectric drive circuits A1, A2, . . . , B1, B2, . . . and the piezoelectric detection circuits C1, C2, . . . , D1, D2, . . . are disposed on the beams 3A in parallel with each other to perform the operations as described above.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:
1. An optical deflection apparatus comprising:
a mirror unit having a reflection plane;
a plurality of actuators to move the minor unit around a prescribed axis;
a drive controller to control operation of the plurality of actuators; and
an abnormality detector to detect an abnormality in at least one of the plurality of actuators,
wherein when the abnormality detector detects an abnormality in at least one of the plurality of actuators, the drive controller controls another one of the plurality of actuators to deflect a light flux incident on the minor unit.
2. The optical deflection apparatus according to claim 1, wherein
the plurality of actuators includes:
a first actuator to move the mirror unit around a first axis; and
a second actuator to move the mirror unit around a second axis orthogonal to the first axis,
the abnormality detector includes:
a first abnormality detector to detect an abnormality in the first actuator; and
a second abnormality detector to detect an abnormality in the second actuator, and
when either the first abnormality detector or the second abnormality detector detects an abnormality in one of the first actuator and the second actuator, the drive controller controls another one of the first actuator and the second actuator to deflect a light flux incident on the minor unit.
3. The optical deflection apparatus according to claim 2, wherein when either the first abnormality detector or the second abnormality detector detects an abnormality in one of the first actuator and the second actuator, the drive controller controls another one of the first actuator and the second actuator to deflect a light flux incident on the mirror unit outside a prescribed range.
4. The optical deflection apparatus according to claim 2, further comprising a third actuator to move the mirror unit, wherein when either the first abnormality detector or the second abnormality detector detects an abnormality, the drive controller controls the third actuator to deflect a light flux incident on the mirror unit outside a prescribed range.
5. The optical deflection apparatus according to claim 2, wherein
the drive controller includes:
a first power source to apply a driving voltage to the first actuator; and a second power source to apply a driving voltage to the second actuator, wherein the first abnormality detector detects an abnormality by detecting an electric current flowing between the first actuator and the first power source, and the second abnormality detector detects an abnormality by detecting an electric current flowing between the second actuator and the second power source.

6. The optical deflection apparatus according to claim 2, further comprising:

a mirror supporting member to support the mirror unit; and a movable supporting unit to support the first actuator, wherein the mirror unit is coupled to the first actuator through the mirror supporting member, the second actuator is coupled to the first actuator through the movable supporting unit, the first actuator includes a first elastic member coupled to the mirror supporting member and a first driving circuit to elastically deform the first elastic member, and the second actuator includes a second elastic member coupled to the movable supporting unit and a second driving circuit to elastically deform the second elastic member.

7. The optical deflection apparatus according to claim 6, wherein the second elastic member has a plurality of beams joining together in a serpentine shape, the second driving circuit has a plurality of piezoelectric drive circuits disposed on the plurality of beams on an individual basis, the drive controller applies two different driving voltages to two of the plurality of piezoelectric drive circuits, respectively, separately disposed on adjacent two of the plurality of beams, to control operation, and the second abnormality detector detects an electric current flowing between the drive controller and the two piezoelectric drive circuits separately disposed on the adjacent two beams, to detect an abnormality in each of the plurality of piezoelectric drive circuits.

8. The optical deflection apparatus according to claim 1, wherein the plurality of actuators includes:

a first actuator including a piezoelectric drive circuit disposed on an elastic member to deform the elastic member; and a second actuator including a piezoelectric detection circuit disposed on the elastic member to detect deformation of the elastic member, and when the abnormality detector detects an abnormality in the first actuator, the drive controller controls the piezoelectric detection circuit to drive the mirror unit.

9. An image projector comprising:

the optical deflection apparatus of claim 1; and a light source unit to emit a laser beam, wherein the plurality of actuators includes a first actuator to move the mirror unit around a first axis and a second actuator to move the mirror unit around a second axis, the abnormality detector includes a first abnormality detector to detect an abnormality in the first actuator, and a second abnormality detector to detect an abnormality in the second actuator, and the optical deflection apparatus projects an image formed by optically scanning the laser beam emitted from the light source unit.

10. The image projector according to claim 9, wherein when either the first abnormality detector or the second abnormality detector detects an abnormality, the drive controller deflects a light flux incident on the mirror unit outside a scanning area from which an image is output.

11. The image projector according to claim 9, further comprising a photodetector disposed outside an area through which the laser beam in a scanning area to be projected as an image passes, to detect the laser beam, wherein when either the first abnormality detector or the second abnormality detector detects an abnormality, the drive controller deflects a light flux incident on the mirror unit outside the photodetector.

12. An optical writing unit comprising:

the optical deflection apparatus of claim 1; and an imaging optical system to faun an image of reflection light, scanned by the optical deflection apparatus, in a shape of a spot on a surface.

13. An object recognition device comprising:

the optical deflection apparatus of claim 1; and a photodetector to receive a laser beam reflected by a target object, wherein the optical deflection apparatus performs scanning with a light flux for measurement towards the target object, and the object recognition device recognizes the target object based on the laser beam reflected by the target object and received by the photodetector.

* * * * *